N. E. GOLDBERG.
DEPOSIT SLIP.
APPLICATION FILED FEB. 7, 1919.

1,339,331.  Patented May 4, 1920.

| RECEIVED BY | DEPOSITOR WILL WRITE AMOUNT AND DATE |
|---|---|
| CITY BANK. CLERK *X.13* NO. *333* | DATE *1-15-19* AMT. *400.* DEPOSITOR WILL RECEIVE THIS RECEIPT. KEEP FOR COMPARISON IN CASE OF ERROR. |

THIS DEPOSIT IS BETWEEN 220 & 319 DOLLARS
THIS DEPOSIT IS BETWEEN 320 & 419 DOLLARS
THIS DEPOSIT IS BETWEEN 420 & 519 DOLLARS
THIS DEPOSIT IS BETWEEN 520 & 619 DOLLARS
THIS DEPOSIT IS BETWEEN 620 & 719 DOLLARS
THIS DEPOSIT IS BETWEEN 720 & 819 DOLLARS
THIS DEPOSIT IS BETWEEN 820 & 919 DOLLARS
THIS DEPOSIT IS BETWEEN 920 & 1019 DOLLARS
THIS DEPOSIT IS BETWEEN 1020 & 1119 DOLLARS
THIS DEPOSIT IS BETWEEN 1120 & 1219 DOLLARS
DO NOT USE THIS SLIP— IF AMOUNT IS UNDER 220 OR OVER 1219 DOLLARS

DEPOSITED TO CREDIT OF
NAME *John Doe*
DATE *January 15-19*
_____CITY BANK
NO. *333*

| PLEASE OMIT ALL DOLLAR SIGNS | | |
|---|---|---|
| GOLD | | 100 |
| SILVER | | 200 |
| BILLS | | 50 |
| CHECKS ON *New York* BANK | | 50 |
|  |  |  |
|  |  |  |
|  |  |  |
|  |  |  |
|  |  | 400 |
| CHECKS SUBJECT TO PAYMENTS | | |

WITNESSES

*Fig. 1.*

| RECEIVED BY | DEPOSITOR WILL WRITE AMOUNT AND DATE |
|---|---|
| CITY BANK CLERK *X.13* NO. *333* | DATE *1-15-19* AMT. *400.* DEPOSITOR WILL RECEIVE THIS RECEIPT KEEP FOR COMPARISON IN CASE OF ERROR. |

THIS DEPOSIT IS BETWEEN 220 & 319 DOLLARS
THIS DEPOSIT IS BETWEEN 320 & 419 DOLLARS

*Fig. 2.*

INVENTOR
Nathan E. Goldberg
BY
ATTORNEYS

UNITED STATES PATENT OFFICE.

NATHAN E. GOLDBERG, OF NEW YORK, N. Y.

DEPOSIT-SLIP.

1,339,331.  Specification of Letters Patent.  Patented May 4, 1920.

Application filed February 7, 1919. Serial No. 275,626.

*To all whom it may concern:*

Be it known that I, NATHAN E. GOLDBERG, a citizen of the United States, and a resident of the city of New York, borough of Manhattan, in the county and State of New York, have invented a new and Improved Deposit-Slip, of which the following is a full, clear, and exact description.

The object of the invention is to provide a new and improved deposit slip for use by depositors in depositing bills, coins, checks, coupons and like monetary valuables in banks and arranged to provide the depositor with a receipt of approximately the amount deposited in addition to the usual entry of the exact amount in the pass book. Another object is to permit the bank of deposit to readily trace any error that may have been made by the receiving teller in the transaction.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in both views.

Figure 1 is a face view of the improved deposit slip; and

Fig. 2 is a face view of the detached receipt.

On a single sheet 10 of paper, preferably at the lower portion thereof, is arranged a blank form of deposit 11 of usual construction, that is, having a heading 12 provided with the usual spaces for the depositor's name and the date of the deposit, also the name of the bank and an identifying number 13 of the depositor. The blank form of deposit is further provided with the usual rulings for indicating the amount to be deposited and the nature of the amounts, whether in coin, bills, checks or the like.

On the sheet 10 and preferably in the upper portion thereof is arranged a receipt 20 having a heading 21 provided with the name of the bank of deposit, a space for the date, a space for the total amount of the deposit, a space for the signature of the receiving teller or other person receiving the deposit, and an identifying number 22 corresponding to the identifying number 13 on the blank form of deposit. Next to the heading 20 are arranged lines of printed matter 25 with scored or tearing lines 26 between adjacent lines of printed matter. Each line of print 25 indicates that the amount of deposit is between certain sums but these sums in the successive lines are progressive, say, for instance, in the first or top line is the statement "This deposit is between 220 & 319 dollars;" the next line reads "This deposit is between 320 & 419 dollars;" and so on progressively for each one hundred dollars, the last line of print reading "This deposit is between 1120 & 1219 dollars." It is understood that I do not limit myself to the progressive amounts shown and described as similar receipts for smaller amounts than $220 and receipts for larger amounts than $1219 may be provided and the differences between the amounts may be less than $100 or more than $100.

In using the deposit slip, the depositor fills out the blank form of deposit in the usual manner and also the receipt 20 and then hands the deposit slip with the amount of deposit and the pass book to the receiving teller, who checks off the date in the heading 21 and the amount, and signs his initials or full name and then tears off along the proper line 26 according to the amount of deposit. Thus if the amount of deposit is $400, as shown in the drawing, the receiving teller tears off along the line immediately below the statement "This deposit is between 320 & 419 dollars" and this torn off part now forms a receipt by the bank and which is handed to the depositor.

From the foregoing it will be seen that by the arrangement described the depositor receives a receipt of approximately the amount deposited thus safeguarding the depositor in case an error is made by the receiving teller in entering the amount in the pass book or in case a wrong entry is made of the amount deposited in the books of the bank. Thus by the arrangement described, a clerical error made by the receiving teller in the transaction can be readily traced and the proper amount verified by the additional receipt in the possession of the depositor.

Having thus described my invention, I claim as new and desire to secure by Letters Patent:

1. A bank deposit slip embodying a body of sheet material having thereon a blank form or certificate of deposit, and at one edge only a receipt blank provided with a heading and a plurality of lines of printed matter one adjacent the other with straight tearing lines therebetween and each indicating an amount of deposit between certain sums, the successive lines of printed matter indicating progressively higher amounts from the receipt blank, all of the data on the sheet body appearing transversely and reading in one direction.

2. A bank deposit slip comprising a single body of sheet material having thereon at the bottom a blank form of deposit having a heading, and at the top a receipt blank, the latter having a heading and a plurality of lines of printed matter one above the other, with scored lines between adjacent lines of printed matter, each heading bearing the name of the bank, and identification means of the depositor, a space for the signature of the receiving teller, a space for the date and a space for the amount of deposit, the said plurality of lines of printed matter each indicating that the amount of the deposit is between certain sums, the sums in successive lines being progressively higher from the receipt blank, the receipt blank being adapted to be torn off next to the line of printed matter indicating the amount of the deposit given on the deposit slip.

NATHAN E. GOLDBERG.